(12) United States Patent
Sakano

(10) Patent No.: US 11,994,166 B2
(45) Date of Patent: May 28, 2024

(54) SEALING DEVICE

(71) Applicant: NOK CORPORATION, Tokyo (JP)

(72) Inventor: Yuya Sakano, Fukushima (JP)

(73) Assignee: NOK CORPORATION, Tokyo (JP)

(*) Notice: Subject to any disclaimer, the term of this patent is extended or adjusted under 35 U.S.C. 154(b) by 188 days.

(21) Appl. No.: 17/641,876

(22) PCT Filed: Jul. 14, 2020

(86) PCT No.: PCT/JP2020/027342
§ 371 (c)(1),
(2) Date: Mar. 10, 2022

(87) PCT Pub. No.: WO2021/049159
PCT Pub. Date: Mar. 18, 2021

(65) Prior Publication Data
US 2022/0325758 A1  Oct. 13, 2022

(30) Foreign Application Priority Data

Sep. 13, 2019 (JP) .................................. 2019-167193

(51) Int. Cl.
*F16C 33/78* (2006.01)
*F16J 15/3232* (2016.01)
*F16J 15/447* (2006.01)

(52) U.S. Cl.
CPC ...... *F16C 33/7823* (2013.01); *F16C 33/7816* (2013.01); *F16C 33/7869* (2013.01);
(Continued)

(58) Field of Classification Search
CPC ................ F16C 33/7816; F16C 33/782; F16C 33/7823; F16C 33/7826; F16C 33/7869; F16C 33/7876; F16C 33/805
See application file for complete search history.

(56) References Cited

U.S. PATENT DOCUMENTS 10,663,033 B2 *  5/2020  Clark .................... F16F 15/267
2009/0257698 A1  10/2009  Aritake et al.
(Continued)

FOREIGN PATENT DOCUMENTS

FR       3 074 861         6/2019
JP       2015212561    *  11/2015
(Continued)

OTHER PUBLICATIONS

Translation of JP2015212561 obtained Nov. 7, 2023.*
(Continued)

*Primary Examiner* — James Pilkington
(74) *Attorney, Agent, or Firm* — GREENBLUM & BERNSTEIN, P.L.C.

(57) ABSTRACT

A sealing device used for a bearing includes an outer race, an inner race, and rotatable members. The inner race includes a flange that faces an edge face of the outer face. The sealing device includes a cylindrical portion, an extension portion, a first annular protrusion, and a second annular protrusion. The cylindrical portion is fixed to an inside of the outer race. The extension portion extends radially outward of an outer surface of the outer race from an end of the cylindrical portion. A part of the extension portion contacts the edge face of the outer face. The first protrusion extends toward the flange from an outer edge of the extension portion. The second protrusion extends toward the flange from a portion that is a part of the extension portion and is radically inward of the first protrusion.

4 Claims, 3 Drawing Sheets

(52) U.S. Cl.
CPC ....... *F16C 33/7876* (2013.01); *F16J 15/3232* (2013.01); *F16J 15/4476* (2013.01); *F16C 2326/02* (2013.01)

(56) References Cited

U.S. PATENT DOCUMENTS

| | | |
|---|---|---|
| 2016/0131257 A1 | 5/2016 | Sakai et al. |
| 2016/0250788 A1 | 9/2016 | Kato et al. |
| 2019/0107155 A1 | 4/2019 | Kato |

FOREIGN PATENT DOCUMENTS

| | | | |
|---|---|---|---|
| JP | 2016-89999 A | | 5/2016 |
| KR | 101228139 | * | 1/2013 |
| WO | WO 2008/044328 A1 | | 4/2008 |
| WO | WO 2015/072170 A1 | | 5/2015 |
| WO | WO 2017/221582 A1 | | 12/2017 |

OTHER PUBLICATIONS

Translation of JP2016089999 (May 2016).*
ISR for PCT/JP2020/027342, dated Sep. 1, 2020 (w/ translation).
Extended European Search Report issued in EP Application No. 20862581.4, dated Sep. 7, 2023.

* cited by examiner

SEALING DEVICE

CROSS-REFERENCE TO RELATED APPLICATIONS

The present application is a U.S. National Stage of PCT/JP2020/027342 filed Jul. 14, 2020, and claims priority of Japanese Appl. No. 2019-167193 filed Sep. 13, 2019. The disclosure of Japanese Appl. No. 2019-167193 is expressly incorporated by reference herein in its entirety.

BACKGROUND ART

Patent document 1 discloses a sealing device for a bearing that is used to rotatably support an automotive wheel. The bearing is a hub bearing, and includes an outer race and an inner race. The inner race includes a flange. The sealing device is provided between the outer race and the inner race of the bearing. The sealing device is provided between the outer race and the inner race of the bearing. The sealing device includes a metal reinforcement ring and a sealing body that is integrally molded with the reinforcement ring. The reinforcement ring includes a cylindrical portion and an outer flange. The cylindrical portion is press-fitted into the inside of the outer ring, which is located close to the flange of the inner race. The outer flange extends radially outward from one end of the cylindrical portion of the reinforcement ring. The seal body includes a dust lip, a grease lip, and a coated layer. The coated layer includes a labyrinth lip. The tips of the dust lip and the grease lip are in contact with the inner race. The tip of the labyrinth lip is not in contact with the flange of the inner race.

RELATED ART DOCUMENT

Patent Document

Patent Document 1: WO 2015/072170

SUMMARY OF THE INVENTION

Problem to be Solved by the Invention

In the above-described sealing device, the labyrinth lip acts to prevent entry of foreign matter (e.g., rainwater, muddy water, and dust) from outside into an internal space of the bearing. However, it is desirable to further improve a sealing performance of this type of sealing device.

An object of the present invention is to provide a sealing device with an improved sealing performance.

Means of Solving the Problem

According to an aspect of the present invention, there is provided a sealing device used for a bearing that includes an outer race, an inner race and rotatable members. The inner race includes a flange that faces an edge face of the outer face. The rotatable members are provided between the outer race and the inner race. The sealing device includes a cylindrical portion, an extension portion, a first annular protrusion and a second annular protrusion. The cylindrical portion is fixed to the inside of the outer race. The extension portion extends radically outward of an outer surface of the outer race from an end of the cylindrical portion. A part of the extension portion contacts the edge face of the outer face. The first protrusion extends toward the flange from an outer edge of the extension portion. The second protrusion extends toward the flange from a portion that is a part of the extension portion and is radically inward of the first protrusion.

Effect of the Invention

According to an aspect of the present invention there is provided a sealing device that has an improved sealing performance.

MODES FOR CARRYING OUT THE INVENTION

Figure 1:
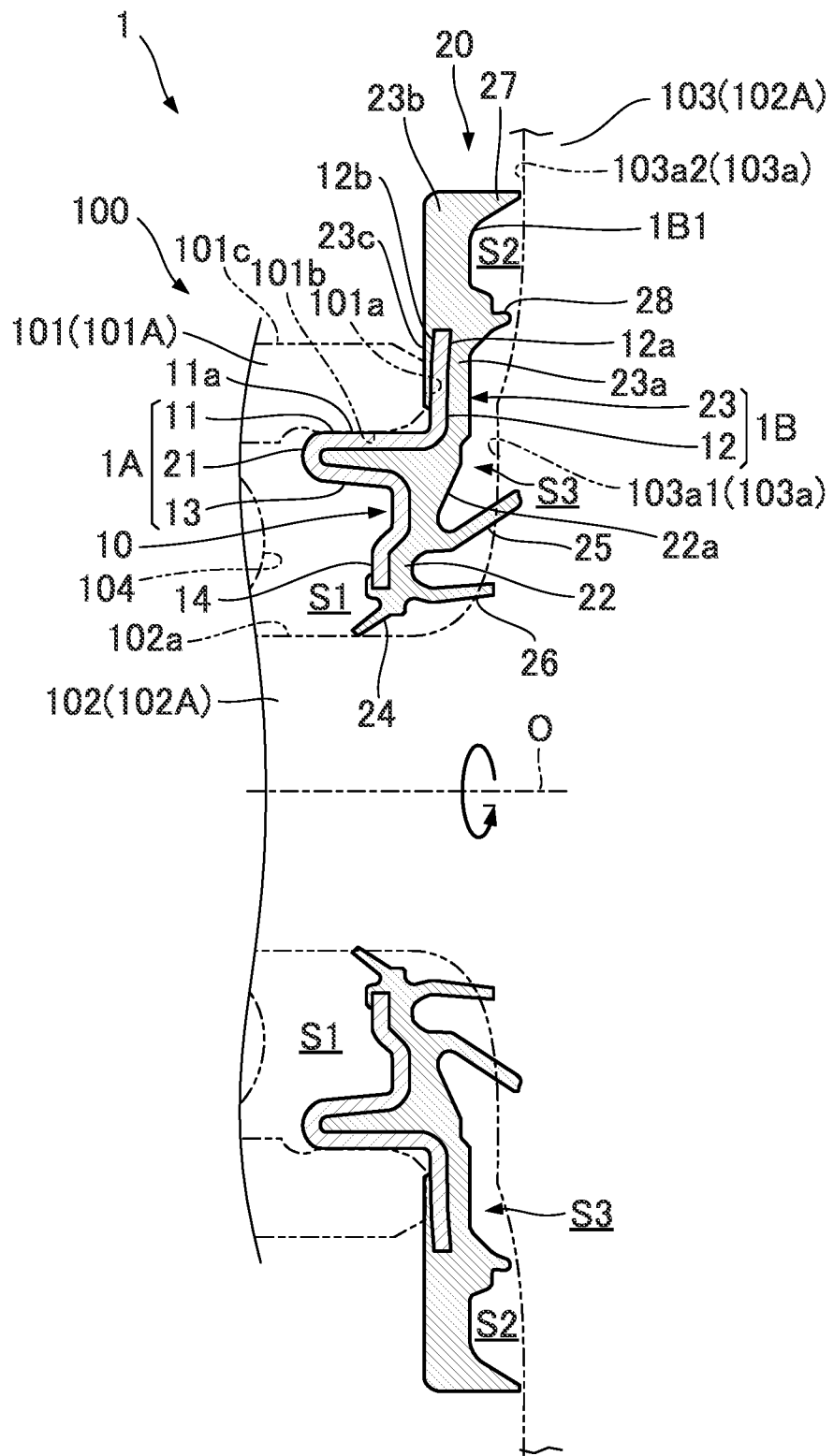
FIG. 1 is a cross-sectional view of a sealing device according to an embodiment of the present invention.
Figure 2:
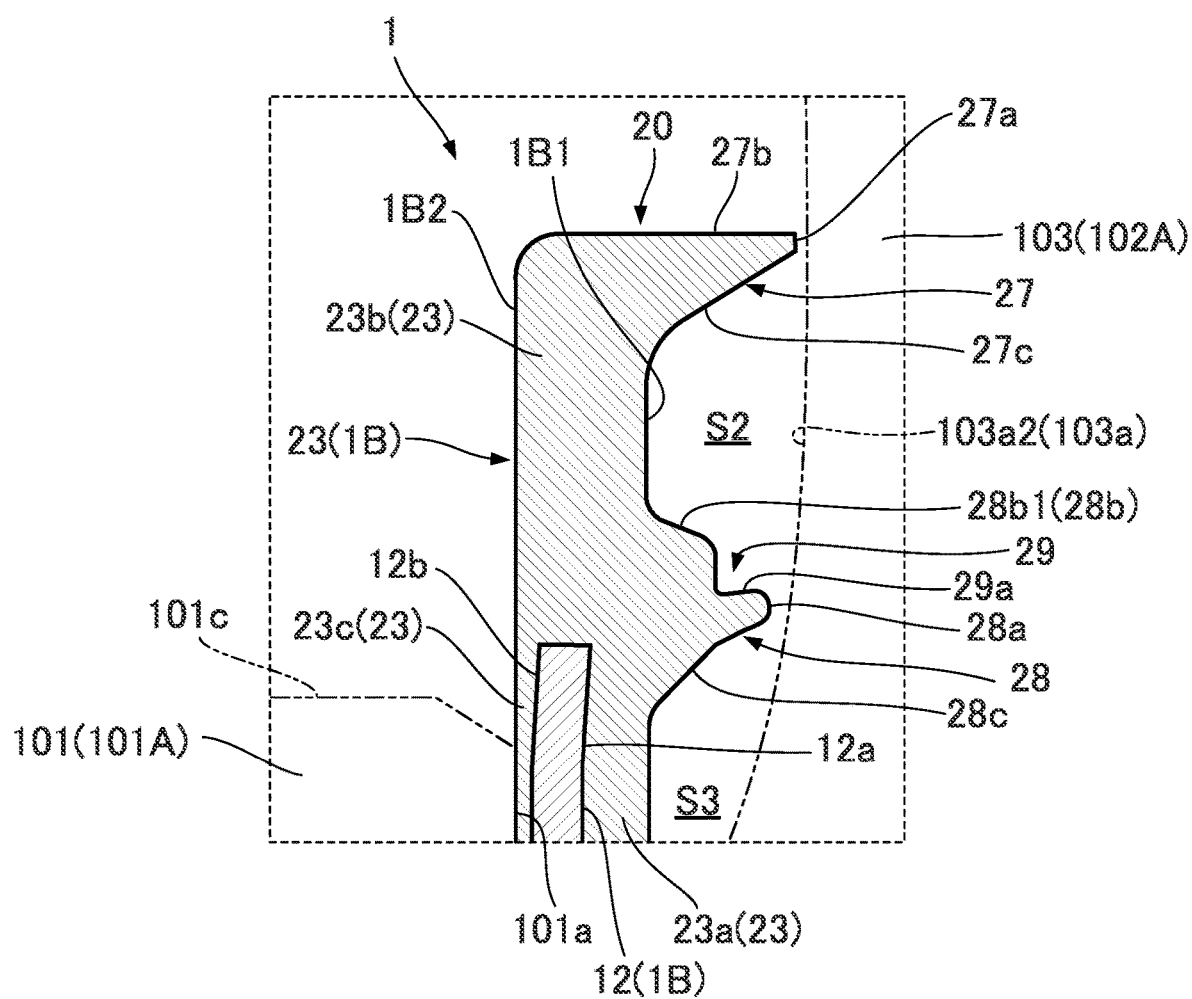
FIG. 2 is an enlarged cross-sectional view of the main part of the sealing device.

Embodiments according to the present invention will now be described below with reference to the attached drawings. FIG. 1 is a cross-sectional view of a sealing device 1 according to the embodiment. In an example of FIG. 1, the sealing device 1 is mounted to a hub bearing 100. FIG. 2 is an enlarged cross-sectional view of the main part of the sealing device 1.

Embodiments according to the present invention will now be described below with reference to the attached drawings. FIG. 1 is a cross-sectional view of a sealing device 1 according to the embodiment. In an example of FIG. 1, the sealing device 1 is mounted to a hub bearing 100. FIG. 2 is an enlarged cross-sectional view of the main part of the sealing device 1.

Object to which the Sealing Device is Mounted

The sealing device 1 is mounted to the hub bearing 100 used in a variety of applications including, for example, automotive vehicles, construction machinery and agricultural machinery. The hub bearing 100 is used to rotatably support a rotatable member such as a wheel.

In the following description, a direction of circumference of a virtual circle with a diameter that is centered on a central axis O of the sealing device 1 is referred to as the "circumferential direction." A direction of a radius of the virtual circle is referred to as the "radial direction." A view from a direction parallel to the central axis O is referred to as the "plan view." A view from a cross-section that includes the central axis O is referred to as the "cross-section view."

The hub bearing 100 includes an outer race 101A and an inner race 102A. The outer race 101A includes a cylindrical outer race body 101. The inner race 102A includes an inner race body 102 and a flange 103. The inner race body 102 has a cylindrical structure, and is press-fitted into the outer race body 101 of the outer race 101A. The flange 103 is provided at one end of the inner race body 102. The flange 103 is an annular portion that protrudes from the outer surface of the inner race body 102.

In one example, the outer race 101A is fixed to a suspension device (not shown in the drawings) of an automotive vehicle. The outer race body 101 of the outer race 101A is positioned around at least a part of the inner race body 102. The outer race body 101 and the inner race body 102 are formed concentrically. There are provided rolling members 104 between the outer race 101A (the outer race body 101) and the inner race 102A (the inner race body 102). The rolling members 104 are disposed at intervals in the circumferential direction, and are held in place by a retainer (not shown in the drawings).

The flange 103 extends outwardly along the radial direction at the end of the inner race body 102 and is substantially annular in plan view. A wheel (not shown in the drawings) is mounted to the flange 103. A rear surface 103a of the flange 103 faces an edge face 101a of the outer race 101A of the outer race body 101, with a gap therebetween. The rear surface 103a of the flange is provided in opposing relation to the wheel and constitutes the left surface, as shown in FIGS. 1 and 2. The edge face 101a of the outer race body 101 faces the flange 103. As described above, the flange 103 faces the edge face 101a of the outer race 101A.

In this embodiment, the base of the flange 103 is curved such that an outer surface 102a of the inner race body 102 and the rear surface 103a of the flange are continuously smooth. The rear surface 103a of the flange includes a first rear surface 103a1 and a second rear surface 103a2. The first rear surface 103a1 extends outwardly from the base of the flange 103 in a direction perpendicular to the central axis O. The first rear surface 103a1 and the second rear surface 103a2 are continuous. The second rear surface 103a2 extends radially outward from the first rear surface 103a1. In one example, in the radial direction, the boundary between the first rear surface 103a1 and the second rear surface 103a2 included in the rear surface 103a is at a position that corresponds to the edge face 101a of the outer race body 101. Further, in one example, the second rear surface 103a2 curves away from the edge face 101a of the outer race body 101 in the radial direction. The second rear surface 103a2 extends parallel to the first rear surface 103a1 in the radial direction.

Schematic Configuration of Sealing Device

The sealing device 1 is used for the hub bearing 100. Grease is filled into a space between the outer race body 101 and the inner race body 102, and the space is sealed by the sealing device 1. The sealing device 1 is mounted between an inner surface 101b of the outer race 101A of the outer race body 101 and the outer surface 102a of the inner race body 102, close to the flange 103.

The sealing device 1 includes a reinforcement ring 10 and a seal body 20. The reinforcement ring 10 is used to reinforce the seal body 20. The seal body 20 extends substantially along the reinforcement ring 10, and is adhesively mounted to the surface of the reinforcement ring 10, for example.

The reinforcement ring 10 includes a first cylindrical portion 11, a first disk portion 12, a second cylindrical portion 13, and a second disk portion 14. In one example, the reinforcement ring 10 is made of metal, and is formed by press working. The reinforcement ring 10 is substantially annular. The metal may be selected from a group consisting of stainless steel, SPCC and SPHC, for example.

The first cylindrical portion 11 is press-fitted into a concave portion at the edge face 101a of the outer race body 101. The outer surface of the first cylindrical portion 11 and the inner surface 101b of the outer race body 101 are in close contact with each other. The outer diameter of the first cylindrical portion 11 is set to be larger than the inner diameter of the outer race body 101 as a result of the amount of press-fitting of the first cylindrical portion 11.

In plan view, a first disk portion 12 is disk-shaped. Specifically, the first disk portion 12 extends radially outward from one end of the first cylindrical portion 11, where the end (the right side end shown in the drawing) is close to the flange 103. The first disk portion 12 and the first cylindrical portion 11 are continuous. The first disk portion 12 is positioned between the edge face 101a of the outer race body 101 and the rear surface 103a of the flange 103. In this embodiment, the first disk portion 12 extends from the end of the first cylindrical portion 11 radially outward of an outer surface 101c of the outer race body 101. The outer end of the first disk portion 12 protrudes slightly radially outward of the outer surface 101c of the outer race body 101.

The second portion 13 is cylindrical. The second cylindrical portion 13 is positioned radially inward of the first cylindrical portion 11, and is formed concentrically with the first cylindrical portion 11. The second cylindrical portion 13 and the first cylindrical portion 11 are continuous. The second cylindrical portion 13 is shaped such that a portion is folded back from one end of two ends of the first cylindrical portion 11, the end corresponding to the left side end as shown in the figure, and close to the flange 103.

In plan view, the second disk portion 14 is disk-shaped. The second disk portion 14 extends radially inward from one end of two ends of the second cylindrical portion 13, where the end is opposite to the first cylindrical portion 11. The second disk portion 14 and the second cylindrical portion 13 are continuous. The second disk portion 14 is positioned between the inner surface 101b of the outer race body 101 and the outer surface 102a of the inner race body 102.

The seal body 20 includes an elastic cylindrical portion 21, a seal base 22, and a seal extension portion 23. The seal body 20 is made of an elastic material. A material such as rubber or thermoplastic elastomer is used as the elastic material.

The elastic portion 21 is cylindrical. The elastic cylindrical portion 21 fills a gap between the first cylindrical portion 11 and the second cylindrical portion 13. The following portion (hereafter, a "cylindrical portion 1A") is substantially cylindrical, and the cylindrical portion 1A thereof includes the first cylindrical portion 11 and the second cylindrical portion 13 of the reinforcement ring 10, and the elastic cylindrical portion 21 of the seal body 20. The cylindrical portion 1A is fixed to the concave portion at the edge face 101a of the outer race 101A (the outer race body 101). In other words, the cylindrical portion 1A is press-fitted into the outer race body 101. The sealing device 1 is fixed to the outer race 101A of the hub bearing 100 in close contact with the outer surface 11a of the first cylindrical portion 11 included in the cylindrical portion 1A to the inner surface 101b of the outer race body 101. The cylindrical portion 1A according to this embodiment corresponds to the "cylindrical portion" according to the present invention.

In plan view, the seal base 22 is disk shaped. The seal base 22 extends radially inward from an end portion of the elastic cylindrical portion 21 close to the flange 103. The seal base 22 extends along a surface of the second disk portion 14 of the reinforcement ring 10, where the surface is closer to the flange 103. At the tip of the second disk portion 14, the surface opposite the surface closer to the flange 103 is covered by a part of the seal base 22.

In this embodiment, the seal base 22 includes a grease lip 24, a side lip 25 and an intermediate lip 26. In the following description, in some instances, the grease lip 24, the side lip 25 and the intermediate lip 26 will be collectively referred to simply as a "lip."

The grease lip 24 extends from the inner end of the seal base 22. The base of the grease lip 24 is connected to the inner end of the seal base 22. The base of the grease lip 24 contacts the outer surface 102a of the inner race body 102, and is slidable on the outer surface 102a. The tip of the grease lip 24 is positioned farther away from the rear surface 103a of the flange than the base of the grease lip 24 in the direction of the central axis O. The grease lip 24 is cylindrically tapered, and its diameter decreases from the base to the tip.

The side lip 25 extends from the side 22a of the seal base 22, where the side 22a faces the flange 103. The base of the side lip 25 is connected to the side 22a of the seal base 22. The tip of the side lip 25 contacts the first rear surface 103a1 of the rear surface 103a of the flange, and is slidable on the first rear surface 103a1. The side lip 25 is cylindrically tapered, and its diameter increases from the base to the tip.

The intermediate lip 26 extends from the side 22a, which is located at the inner end of the seal base 22. The intermediate lip 26 is positioned between the grease lip 24 and the side lip 25. The tip of the intermediate lip 26 is connected to the side 22a of the seal base 22. The tip of the intermediate lip 26 is in slidable contact with the curved portion of the base of the flange 103, where the curved portion is continuous to the inner race body 102. The intermediate lip 26 is cylindrically tapered, and its diameter increases from the base to the tip.

In the cylindrical portion 1A, the portion of the seal extension portion 23 close to the flange 103 extends radially outward. A part of the seal extension portion 23 contacts the edge face 101a of the outer race body 101. Specifically, the seal extension portion 23 includes a first extension portion 23a, an extension portion 23b and a second extension portion 23c.

In plan view, the first extension portion 23a is disk shaped. Specifically, the first extension portion 23a extends radially outward along the first side 12a of the first disk portion 12 of the reinforcement ring 10, where the first side 12a is close to the flange 103. In plan view, the extension portion 23b is disk shaped, similar to the first extension portion 23a. Specifically, the extension portion 23b extends further radially outward from the first extension portion 23a and covers the outer end of the first disk portion 12 of the reinforcement ring 10. The second extension portion 23c is disk shaped and extends radially outward from the inner portion of the extension portion 23b. The second extension portion 23c extends along the second side 12b of the first disk portion 12 of the reinforcement ring 10, where the second side 12b is opposite the first side 12a. The second extension portion 23c has a flat surface. There are no steps between the surface of extension portion 23c and the surface of the extension portion 23b opposite the flange 103.

In the aforementioned sealing device 1, the first disk portion 12 of the reinforcement ring 10 and the seal extension portion 23 of the seal body 20 comprises an extension portion 1B. As a whole, the extension portion 1B extends radially outward from the end portion of the cylindrical portion 1A beyond the outer surface 101c of the outer race 101A (the outer race body 101). In other words, the outer edge of the extension portion 1B (specifically, the extension portion 23b) protrudes radially outward beyond the outer surface 101c of the outer race body 101. A part of the extension portion 1B contacts the edge face 101a of the outer race 101A. The extension portion 23B acts to prevent foreign matter, such as rainwater, muddy water or dust from reaching the gap between the flange 103 and a first protrusion 27 described later. In this embodiment, the extension portion 1B including the first disk portion 12 and the seal extension portion 23 corresponds to an "extension portion" of the present invention.

The sealing device 1 is mounted to the hub bearing 100 and defines an annular inner space S1 in the hub bearing 100. Upon mounting the sealing device 1, the second extension portion 23c of the seal extension portion 23 is elastically deformed by being pressed against the edge face 101a of the outer race body 101. The tips of the lips (24, 25 and 26) are also elastically deformed by being pressed against corresponding portions. FIG. 1 shows a state before elastic deformation occurs. Each of the lips (24, 25 and 26) of the sealing device 1 acts to minimize or prevent grease from leaking out of the inner space S1 to the outside. In addition, each of the lips acts to minimize or prevent foreign matter, such as dust, rainwater, or muddy water from entering the inner space S1 from the outside.

Structure of Sealing Device

Next, detailed description will be given of the structure of the sealing device 1 according to this embodiment. FIG. 2 is an enlarged cross-sectional view of the main part of the sealing device 1.

The extension portion 1B of the sealing device 1 further includes a first protrusion 27 and a second protrusion 28. The first protrusion 27 and the second protrusion 28 are each annular in form. In this embodiment, the first protrusion 27 and the second protrusion 28 are provided on the seal extension portion 23, which constitutes a part of the extension portion 1B.

The first protrusion 27 is formed on the surface 1B1 of the seal extension portion 23 (the extension portion 1B). The surface 1B1 faces the flange 103. The second protrusion 28 is formed on the surface 1B1, and is positioned radially inward of the first protrusion 27. In other words, the second protrusion 28 is provided between the first protrusion 27 and the side lip 25.

Between the tip 27a of the first protrusion 27 and the rear surface 103a (especially, the second rear surface 103a2) of the flange, a slight gap is also present. Similarly, between a tip 28a of the second protrusion 28 and the rear surface 103a of the flange (the second rear surface 103a2), a slight gap is present. A concavity is formed by the first protrusion 27, the second protrusion 28, and a portion of the surface 1B1 between the first protrusion 27 and the second protrusion 28. The concavity faces the rear surface 103a of the flange. The concavity and the rear surface 103a of the flange define a first annular space S2. Another concavity is formed by the second protrusion 28, the side lip 25, a portion of the surface 1B1 between the second protrusion 28 and the side lip 25, and the side 22a of the seal base 22 (see FIG. 1). The concavity faces the rear surface 103a of the flange. The concavity and the rear surface 103a of the flange define the second annular space S3.

The first protrusion 27 and the rear surface 103a of the flange together constitute a first labyrinth seal. The first labyrinth seal acts to minimize or prevent inflow of liquid, such as rainwater or muddy water (hereafter, "external liquid"), into the first annular space S2 through the gap between the tip 27a of the first protrusion 27 and the rear surface 103a of the flange. Thus, the first protrusion 27 is also referred to as a first labyrinth lip that comprises the first labyrinth seal.

The first protrusion 27 is positioned at the outer end of the surface 1B1 of the seal extension portion 23 (the extension portion 1B) in the radial direction. The first protrusion 27 extends toward the flange 103 from the outer edge of the extension portion 1B.

In this embodiment, the first protrusion 27 is concentrically disposed in the cylindrical portion 1A. The cross section of the first protrusion 27 is substantially a right angle triangle. Specifically, an outer surface 27b of the first protrusion 27 corresponds to one of the two orthogonal sides of a right angle triangle. An inner surface 27c of the first protrusion 27 corresponds to the oblique side of the right angle triangle. The outer surface 27b of the first protrusion 27 is flat. There are no steps on the outer surface of the seal extension portion 23. In one example, the outer surface 27b extends parallel to the central axis O (see FIG. 1). The outer diameter of the first protrusion 27 is identical to that of the extension portion 1B (the seal extension portion 23). An inner surface 27c of the first protrusion 27 is inclined such that a diameter of the inner surface 27c increases as it approaches the flange 103. In other words, the inner diameter of the first protrusion 27 increases as it extends from the extension portion 1B to the flange 103 (the tip 27a). The inner diameter of the inner surface 27c at the end close to the flange 103 is larger than that of the extension portion 1B at the end close to the inner surface 27c.

The second protrusion 28 and the rear surface 103a of the flange 103 together constitute a second labyrinth seal. The position of the second labyrinth seal is positioned radially inward of the first labyrinth seal. The second labyrinth seal acts to minimize or prevent inflow of external liquid, which has flowed into the first annular space S2, into the second annular space S3 through the gap between the tip 28a of the second protrusion 28 and the rear surface 103a of the flange. In other words, the second protrusion 28 is also referred to as a second labyrinth lip that comprises the second labyrinth seal.

As described above, the second protrusion 28 is positioned at the surface 1B1 of the seal extension portion 23 radially inward of the first protrusion 27. The second protrusion 28 extends toward the flange 103 from a portion of the extension portion 1B, where the portion is positioned radially inward of the first protrusion 27. In this embodiment, the second protrusion 28 is positioned radially outward of the outer surface 101c of the outer race 101A.

In this embodiment, the second protrusion 28 is disposed concentrically in the cylindrical portion 1A. The cross section of the second protrusion 28 is substantially triangular. In this embodiment, the outer surface 28b of the second protrusion 28 is inclined such that the diameter of the second protrusion 28 decreases as it approaches the flange 103, except for an area of a liquid receiver 29, which will be described later. In other words, the outer diameter of the second annular protrusion 28 substantially decreases as it extends from the extension portion 1B to the flange 103 (the tip 28a). The outer diameter of the outer surface 28b at the end near the flange 103 is smaller than that of the outer surface 28b at the end close to the extension portion 1B.

In this embodiment, a liquid receiver 29 is formed on the outer surface 28b of the second protrusion 28. The liquid receiver 29 extends radially inward to form a concave portion in the outer surface 28b, and is formed along the entire circumference. The liquid receiver 29 is positioned at a portion of the outer surface 28b of the second protrusion 28, where the outer surface 28b is close to the flange 103. In one example, the liquid receiver 29 is formed by cutting out inwardly along the radial direction a portion where the outer surface 28b of the second protrusion 28 that is close to the tip 28a. In this embodiment, a bottom 29a of the liquid receiver 29 corresponds to the outer surface of the tip 28a in the second protrusion 28. The bottom 29a is inclined such that the diameter of the bottom 29a increases as it approaches the flange 103. In other words, the outer diameter of the annular bottom 29a of the liquid receiver 29 increases as it extends from the extension portion 1B to the flange 103. Thus, an outer diameter of a portion of the bottom 29a, the portion close to the flange 103, is larger than that of a portion of the bottom 29a that is close the extension portion 1B.

In this embodiment, a guide surface 28b1 is formed on a portion of the outer surface 28b of the second protrusion 28, where the portion is close to the extension portion 1B (the base of the second protrusion 28). The guide surface 28B1 is a surface for guiding external liquid to the liquid receiver 29. Specifically, the guide surface 28b1 is an area of the outer surface 28b that spans the edge close to the extension portion 1B and the beginning of the concavity in the liquid receiver 29. Accordingly, in this embodiment, the guide surface 28b1 is inclined such that the diameter of guide surface 28b1 decreases as it approaches the flange 103. In other words, the outer diameter at the end of the guide surface 28B1, which is close to the flange 103 is smaller than that at the end of the guide surface 28B1, which is close to the extension portion 1B.

Figure 3:
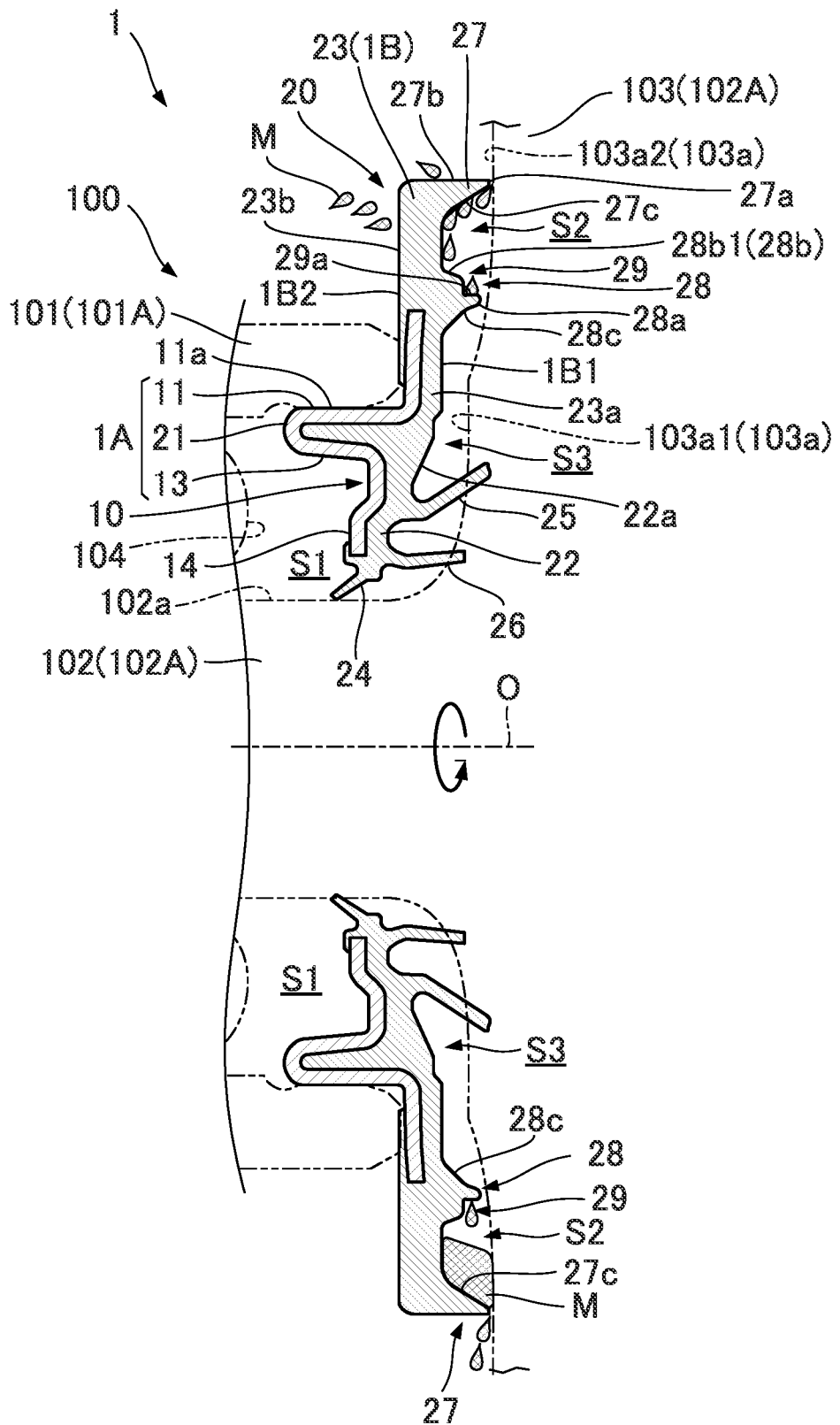
FIG. 3 is a schematic diagram showing sealing and draining actions of the sealing device.

Next, description will be given with reference to FIG. 3 of sealing and draining actions achieved by the sealing device 1 against external liquid M, such as rainwater or muddy water. In FIG. 3, the upper side of the figure depicts an upward vertical direction, while the lower side of the figure depicts a downward vertical direction.

In some cases, external liquid M dispersed from the ground by a wheel may adhere to the hub bearing 100. Further, in some cases, in the vicinity of the vertical upper region of the flange 103, the external liquid M may splash from the outer race body 101 against the rear surface 103a of the flange 103. In this case, some of the external liquid M that splashes toward the rear surface 103a of the flange collides with the surface 1B2, which is opposite the surface 1B1 of the extension portion 23b of the extension portion 1B. Thus, the extension portion 23b acts as a splash guard that prevents the external liquid M from reaching the gap between the tip 27a of the first protrusion 27 and the rear surface 103a of the flange.

In some cases, some of the external liquid M splashes toward the rear surface 103a of the flange and projects over the outer edge (the upper end shown in FIG. 3) of the extension portion 23b of the extension portion 1B. However, since the first protrusion 27 is formed on the outer edge of the extension portion 1B (the radially outward end of the surface 1B1), most of the external liquid M that flies over the outer edge of the extension portion 23b of the extension portion 1B collides with the outer surface 27b of the first protrusion 27, and is deflected and falls to the ground. Thus, the external liquid M does not reach the gap between the tip 27a of the first protrusion 27 and the rear surface 103a of the flange. Even if the external liquid M does come close to the tip 27a of the first protrusion 27, the first labyrinth seal, which includes the first protrusion 27 and the rear surface 103a of the flange, minimizes or prevents an inflow of the external liquid M into the first annular space S2.

In some cases, the external liquid M may reach and pass through the gap between the tip 27a of the first protrusion 27 and the rear surface 103a of the flange from the vertically upper position. Even in this case, the external liquid M temporarily pools in the vertically upper portion of the first annular space S2. In other words, the external liquid M flowing into the first annular space S2 flows downward through the inner surface 27c of the first protrusion 27, and reaches the guide surface 28b1 of the second protrusion 28. The external liquid M that reaches the guide surface 28b1 flows toward the tip 28a of the second protrusion 28. However, before reaching the tip 28a, the external liquid M is guided by the guide surface 28b1 to the liquid receiver 29 and is received by the liquid receiver 29. As a result, the external liquid M that passes through the gap between the tip 27a of the first protrusion 27 and the rear surface 103a of the flange is temporarily pooled in the first annular space S2. Even when some of the external liquid M passes through the gap and falls downward, most of the external liquid M is received by the liquid receiver 29 and is temporarily pooled in the first annular space S2.

The second labyrinth seal is provided between the first annular space S2 and the second annular space S3, and includes the second protrusion 28 and the rear surface 103a of the flange. The second labyrinth seal minimizes or prevents inflow of external liquid M from the first annular space S2 to the second annular space S3. In addition, the second labyrinth seal enhances the pooling capacity of the external liquid M in the first annular space S2, as a result of which the external liquid M can be readily pooled in the first annular space S2.

In the vertically upper region of the first annular space S2, most of or all of the external liquid M received by the liquid receiver 29 trickles down along the bottom 29a of the liquid receiver 29 (i.e., across the outer circumference of the second protrusion 28). The external liquid M is then pooled in the vertically lower region of the first annular space S2. The external liquid M in the first annular space S2 is then drained to the outside (below the sealing device 1) through the gap between the tip 27a of the first protrusion 27 and the rear surface 103a of the flange. In this way, most of or all of the external liquid M in the vertically upper region in the first annular space S2 is drained to the outside without reaching the gap between the tip 28a of the second protrusion 28 and the rear surface 103a of the flange.

In the sealing device 1 according to this embodiment, the extension portion 1B extends radially outward from the end of the cylindrical portion beyond the outer surface 101c of the outer race 101A (the outer race body 101). Moreover, the first protrusion 27 extends from the outer edge of the extension portion 1B toward the flange 103. As a result, most of the external liquid M that flies over the outer edge of the extension portion 1B does not reach the gap between the tip 27a of the first protrusion 27 and the rear surface 103a of the flange. Rather, the external liquid M collides with the outer surface 27b of the first protrusion 27 and falls toward the ground. As a result, inflow of external liquid M (or dust) into the inner space S1 of the hub bearing 100 is effectively minimized or prevented. Accordingly, the sealing device 1 provides an improved and effective seal against an inflow of external liquid M into the inner space S1, as result of which inflow of the external liquid M is substantially minimized or prevented.

In this embodiment, the tips 27a and 28a constitute the labyrinth seal. Neither the tip 27a of the first protrusion 27 nor the tip 28a of the second protrusion 28 is in contact with the rear surface 103a of the flange 103. As a result an increase in rotational torque of the hub bearing 100 is prevented, rotational torque is reduced, and a sealing capacity against the external liquid M is enhanced. In addition, since multiple labyrinth seals are provided concentrically at multiple stages, sealing against foreign matter, such as external liquid M is also enhanced, thereby providing an overall improvement in sealing ability.

In this embodiment, not only the first protrusion 27 but also the second protrusion 28 is positioned more outwardly than the outer surface 101c of the outer race 101A (the outer race body 101). As a result a distance between the first annular space S2 and the inner space S1 of the hub bearing 100 can be increased. In other words, the first annular space S2 is positioned radially outward from the inner space S1, and thus a sealing performance for the inner space S1 is improved.

In this embodiment, on the outer surface 28b of the second protrusion 28, the liquid receiver 29 that is concave radially inward is formed around the circumferential direction. As a result, a pooling capacity of external liquid M in the first annular space S2 and a draining capacity of the external liquid M is improved. The draining of the external liquid M is an action of draining the external liquid M to the outside. The liquid receiver 29 is formed by cutting out in an inward radial direction a portion where the outer surface 28b of the second protrusion 28 that is close to the tip 28a. This facilitates molding of the liquid receiver 29.

In this embodiment, the bottom 29a of the liquid receiver 29 is inclined such that the diameter of the bottom 29a expands as it approaches the flange 103. This enables external liquid M to be received with ease by the liquid receiver 29. As a result, draining of the external liquid M is improved. In addition, it is ensured that the external liquid M in the liquid receiver 29 is prevented from reaching the gap between the tip 27a of the first protrusion 27 and the rear surface 103a of the flange, and that the reach of the external liquid M is reduced.

In this embodiment, the liquid receiver 29 is positioned at a portion of the outer surface 28b of the second protrusion 28, where the portion is close to the flange 103. The guide surface 28B1, which guides external liquid M to the liquid receiver 29, is formed on a portion of the outer surface 28B of the second protrusion 28, where the portion is close to the extension portion 1B. This configuration ensures that the external liquid M is guided by the guide surface 28b1 to the liquid receiver 29. In this embodiment, the guide surface 28b1 is inclined such that the diameter of the guide surface 28b1 decreases as it approaches the flange 103. This enables the external liquid M to be effectively guided by the liquid receiver 29.

Modifications

In this embodiment, the first and second protrusions 27 and 28 are provided as two labyrinth seals. However, the number of labyrinth seals is not limited thereto, and may be three or more. In this case, an additional protrusion may be provided between the first protrusion 27 and the side lip 25. The first and second protrusions 27 and 28 do not come into contact with the rear surface 103a of the flange 103. However, the configuration is not limited thereto. One or both of the first and second protrusions 27 and 28 may contact the rear surface 103a of the flange.

In this embodiment, the outer surface 27b of the first protrusion 27 extends parallel to the central axis O. However, the outer surface 27b may be inclined such that the diameter of the outer surface 27b decreases as it approaches the central axis O from the flange 103 to the outer race body 101. As a result, inflow of the external liquid M into the first annular space S2 can be more reliably suppressed or prevented. Although the liquid receiver 29 is formed at the end of the outer surface 28b of the second protrusion 28, where the end is close to the tip 28a, although the configuration is not limited thereto. The liquid receiver 29 may be formed at a portion of the outer surface 28b of the second protrusion 28, where the portion is close to the extension portion 1B. As a result, the liquid receiver 29 is formed to include side walls at both ends of the bottom 29a, which improves the pooling and draining capacity of external liquid M.

The sealing device 1 includes the reinforcement ring 10. However, the configuration is not limited thereto. The sealing device 1 need not include the reinforcement ring 10. In this case, the portion corresponding to the reinforcement ring 10 may be integrally formed with the seal body 20 by use of the same material as that used for the seal body 20. The bearing to which the sealing device 1 is mounted is not limited to the hub bearing 100. In one example, the sealing device 1 is used for a bearing having a structure that includes an outer race, an inner race and routable members provided between the outer race and the inner race, the inner race including a flange that faces an edge face of the outer face.

Some preferred embodiments and modifications of the invention have been described. However, the invention is not limited to the described embodiments and modifications, and various modification and changes are conceivable within the technical concept of the invention.

The invention claimed is:

1. A sealing device used for a bearing that includes an outer race, an inner race, and rotatable members provided between the outer race and the inner race, the inner race including a flange that faces an edge face of the outer race, the sealing device comprising:
   a cylindrical portion fixed to an inside of the outer race;
   an extension portion that extends radially outward of an outer surface of the outer race from an end of the cylindrical portion, where a part of the extension portion contacts the edge face of the outer race;
   a first protrusion that is annular and extends toward the flange from an outer edge of the extension portion, wherein an outer surface of the first protrusion defines a radially outermost surface of the sealing device and extends generally parallel to a central axis of the cylindrical portion; and
   a second protrusion that is annular and extends toward the flange from a portion that is a part of the extension portion and is radially inward of the first protrusion, wherein the second protrusion is positioned radially outwardly of the outer surface of the outer race.

2. The sealing device according claim 1, wherein on an outer surface of the second protrusion, a liquid receiver that is concave radially inward is formed along a circumferential direction.

3. The sealing device according claim 2, wherein an outer diameter of a bottom of the liquid receiver increases in a direction extending from the extension portion towards a distal end of the second protrusion.

4. The sealing device according claim 2, wherein the second protrusion includes a guide surface defined by a portion of the outer surface of the second protrusion, and wherein the guide surface is interposed between a surface of the extension portion and the liquid receiver such that the liquid receiver is spaced apart from the surface of the extension portion in a direction of the central axis of the cylindrical portion.

* * * * *